United States Patent Office 3,059,159
Patented Oct. 16, 1962

3,059,159
OVERSPEED PROTECTION FOR ADJUSTABLE SPEED DRIVES
Syed Kazim Reza, Williamsville, N.Y., assignor to Westinghouse Electric Corporation, East Pittsburgh, Pa., a corporation of Pennsylvania
Filed Dec. 10, 1959, Ser. No. 858,697
6 Claims. (Cl. 318—46)

The present invention relates to overspeed protection for dynamoelectric machines and more particularly to overspeed protection for adjustable speed electric drives.

In many applications where adjustable speed drives are utilized, it is essential that the speed of the motor does not exceed the no-load speed by more than 10% or, in many cases, some other proportions, while at the same time it is desirable to provide for adjustable speed operation. This is particularly true in machine tools and especially grinding machines where excessive speed may tend to cause the grinding wheel to fall apart. This presents a dangerous situation for the operator of the machine and a costly replacement of the grinding wheel. It also causes down time. In certain applications, an adjustable speed drive is provided which includes an alternating current motor and a direct current motor driving a single shaft. The rectified slip power of the alternating current motor is applied to the armature of the D.C. motor. Such a drive is more thoroughly described in a copending application, Serial No. 728,659, by V. N. Mazur, filed April 15, 1958, and assigned to the assignee of the present invention. Basically, such an adjustable speed drive consists of a wound rotor motor and a D.C. motor built on a common output shaft. Semiconductor rectifiers rectify slip power from the wound rotor to supply direct current to the D.C. motor armature. D.C. voltage is provided to energize a shunt field of the D.C. motor. Speed control is simply obtained by varying the setting of the rheostat in the shunt field circuit, but the system readily permits inclusion of electronic and magnetic amplifier equipment for field control. The drive speed range is obtained by proper design selection of base speed of the D.C. motor in relationship of its rated voltage to the voltage available from the wound rotor. In this drive, the wound rotor motor operates somewhat conventionally and unusual drive characteristics are made possible by the D.C. motor. Since the counter-electromotive force generated by the D.C. motor bucks the rectified output voltage from the wound rotor, the difference between the two voltages causes current to circulate through the rectifiers, the D.C. armature, and the wound rotor. Thus, if the D.C. field is weakened, the counter E.M.F. decreases and more current flows. Consequently, both A.C. and D.C. motors deliver increased torque and the drive is accelerated; as drive speed increases, rotor slip voltage decreases and armature counter E.M.F. increases until the difference is adequate to circulate load current at the new speed. If, for some reason, the D.C. motor shunt field is lost or an open circuit occurs therein, it is possible that the drive may exceed its no-load speed. If this occurred, for example, on a grinder as pointed out hereinabove, serious consequences might ensue, as for example, the destruction of a grinding wheel.

The principal object of the present invention is to provide an overspeed protective device for adjustable speed drives for keeping no-load speed below a preselected value at any set speed.

Another object of the invention is to provide an overspeed protective device for adjustable speed drives which utilizes the slip voltage of an alternating current motor for sensing the speed of the drive.

A further object of the invention is to provide an overspeed protective device for adjustable speed drives which will disconnect a drive from its power source when the running speed of the drive exceeds the set speed by a predetermined percentage of the set speed at any set speed.

Other objects and advantages of the invention will be apparent from the following detailed description, taken in connection with the accompanying drawings, in which.

Figure 1:
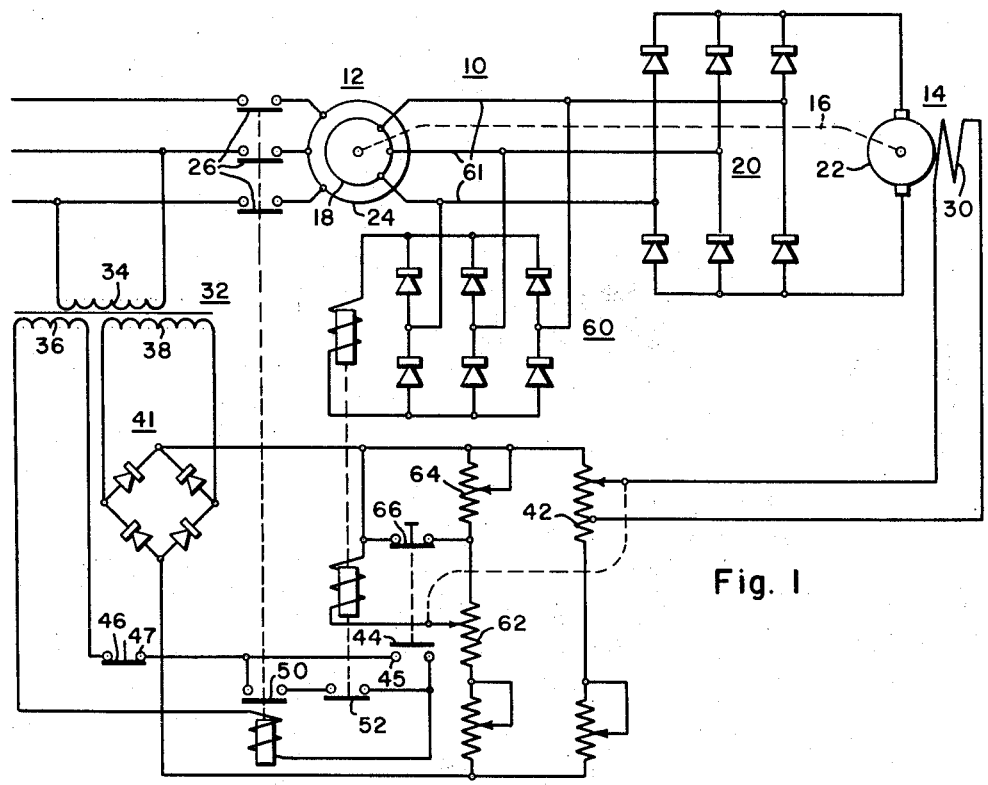
FIGURE 1 is a schematic diagram illustrating the invention.

Referring to the drawings, FIG. 1 schematically illustrates a circuit diagram of a preferred embodiment of the invention adapted to be applied to an adjustable speed motor drive. It will be understood that the invention may be employed to interrupt or signal overspeed of other drives utilizing an alternating current motor.

An adjustable speed drive 10 is shown which includes a wound rotor alternating current motor 12 and a separately excited or shunt excited direct current motor 14 coupled on a common output shaft 16. The rotor 18 of alternating current motor 12 is connected through slip power rectifier 20 to armature 22 of direct current machine 14. The rectifier 20 preferably comprises a plurality of dry-type semiconductor rectifier elements as for example, silicon. However, any suitable means for rectifying the slip voltage of the alternating current motor 12 may be employed. The rectified slip power of the wound rotor 18 supplies direct current to the direct current motor armature 22 of motor 14. The stator winding 24 of alternating current motor 12 is energized through a set of main contacts 26 from an alternating current power line. A separately excited field 30 is provided for the D.C. motor and is supplied from a direct current source.

As shown in the drawing, FIG. 1, a transformer 32 having a primary winding 34 and secondary windings 36 and 38 is provided. Primary winding 34 of the transformer 32 is energized from the alternating current source which supplies power for the alternating current motor. The transformer secondary 36 supplies power for the relay coil 39 of relay 40 which actuates main contactor 26. The transformer secondary 38 supplies power for exciting the D.C. motor field through a rectifier bridge 41. A field control rheostat 42 is provided across the D.C. field for speed control. In series with the secondary 36 of transformer 32 are contacts 45 of start push-button 44, contacts 47 of a stop push-button 46 and a relay coil 39 of main contactor relay 40. Connected across the pair of contacts 45 associated with start push-button 44 is a holding contactor 50 and an overspeed contactor 52. When the start push-button 44 is pressed, power is supplied to the main contactor coil 39 which actuates contactors 26 and 50 to closed position. So long as overspeed contacts 52 are closed, the coil 39 is energized and the contacts 26 remain closed thereby energizing the drive.

Thus far, there has been described an adjustable speed drive similar to that more fully disclosed in application Serial No. 728,659, by V. N. Mazur, filed April 15, 1958, and assigned to the Westinghouse Electric Corporation. The operation of the alternating current motor 12 portion of the drive is like that of the conventional wound rotor motor. In an ordinary wound rotor motor, however, the secondary output of the motor is absorbed in resistors and dissipated. In this drive, the alternating current output is rectified by rectifiers 20 and used to power the D.C. motor armature 22. This not only increases the drive efficiency, but introduces inherent speed regulation in the drive. The alternating current secondary voltage increases as the speed of the shaft decreases so that energization of the direct current motor 14 is increased as the speed of the shaft decreases.

Speed of the drive is controlled by changing the field excitation of the direct current motor by adjustment of the rheostat 42. When field current is applied to the direct current motor, a counter E.M.F. is generated in the armature of the direct current motor that opposes the rectified alternating current output of the rotor over the speed range. The difference between these voltages is such that the rectified motor voltage of the alternating current component is sufficient to circulate load current through the rotor. When the D.C. component field is weakened, the generated counter E.M.F. decreases, allowing more current to circulate. This produces more torque and the drive accelerates. Now, as the speed increases, the rotor slip voltage of the alternating current component decreases and the counter E.M.F. increases. When these voltages differ by the amount required to circulate the load current at the new speed, the drive ceases to accelerate and stabilizes at that speed. When the speed is decreased, the above process operates in just manner.

It is, of course, clear that when the drive increases its speed, the slip power decreases, proportionately. Therefore, the speed of the drive can be sensed by measuring the output of the A.C. rotor. The present invention utilizes this principle to protect against overspeed of the drive due to loss or shorting of the D.C. field or for any other reason which may cause the speed to vary. An overspeed relay 54 is provided which has two wire wound coils 56 and 58 and a pair of normally open contacts 52. The voltage on each coil 56 and 58 is applied in such a manner that the ampere turns in coil 56 and the ampere turns in coil 58 both produce flux which is aiding to pick up the relay contacts 52. The coil 56 is connected across the output of the A.C. rotor through a rectifier 60. Rectifier 60 is connected across the leads 61 from the alternating current rotor to the rectifier 20. The coil 58 is connected across the shunt field excitation circuit in parallel with a calibrating rheostat 62 and a resistor 64 in series. The rheostats 62 and 42 have adjusting arms connected to operate in synchronism so that when the resistance across the D.C. motor shunt field is decreased, the resistance in parallel with the coil 58 is increased. Thus, as the speed of the drive is increased, the voltage and therefore the ampere turns of the coil 58 is increased.

A second pair of contacts 66 is provided on push-button 44. The contacts 66 are connected across the resistance 64. When the start push-button 44 is depressed closing the starting contacts 45, the contacts 66 connected across the resistor 64 open. When the start button is released, the contacts 66 close shorting out the resistance 64. This is for a purpose to be explained hereinafter. The overspeed relay 54 is so calibrated that the relay contacts 52 will drop open when the summation of the ampere turns of coil 56 and coil 58 drops below a predetermined percentage of the total ampere turns on coil 56 and coil 58 when the motor is operating at a set speed. At any given speed, the ampere turns on coil 58 will remain constant as can be clearly seen. However, the ampere turns on coil 56 will vary inversely with the speed of the drive. Thus, for example, when it is desired to maintain the speed of the drive within a speed not in excess of 10% above the set speed, the drop out point will be the summation of the ampere-turns of coil 56 plus the ampere-turns of coil 58 minus $\frac{1}{10}$ the ampere-turns on coil 56. Therefore, when the speed of the drive reaches a value 10% above the set speed, the ampere turns on coil 56 will decrease by 10% thereby reaching the drop out point of the overspeed relay 54 opening the contacts 52 and disconnecting the drive from its power source. This will be true at any set speed.

The coil 58 may be calibrated by use of the rheostat 62 so that the summation of the ampere-turns on coil 56 plus the summation of ampere-turns on coil 58 minus the desired fraction of the ampere-turns on coil 56 will equal a constant drop out point. The relay 54 is set to pick up at ampere-turns above the summation of the ampere turns of coil 56 and coil 58 and therefore, when the start button is pressed, the resistor 64 is inserted in series with the calibrating rheostat 62 applying more voltage to calibrating coil. This additional voltage will increase the ampere turns in calibrating coil 58 allowing the relay to pick up. When the push button is released, the resistor 64 is short-circuited allowing the calibrating coil 58 to be at the required voltage. If the adjustable speed drive is set to operate at some higher set speed, the ampere turns on coil 56 will decrease in proportion to the decrease in slip voltage and increase in speed of the drive. The increase in speed of the drive is accomplished by adjustment of the field control rheostat 42. The calibration rheostat 62 operates in synchronism with the adjustment of field control rheostat 42 so that as the rheostat 42 is adjusted, increased resistance will be placed in parallel with the calibration coil 58. This will increase the voltage and therefore the ampere-turns on coil 58. Thus, the drop out point will remain the same and the percentage increase in the speed of the motor at a given set speed will cause the overspeed relay to stop the drive at the desired percentage increase in speed.

Figure 2:
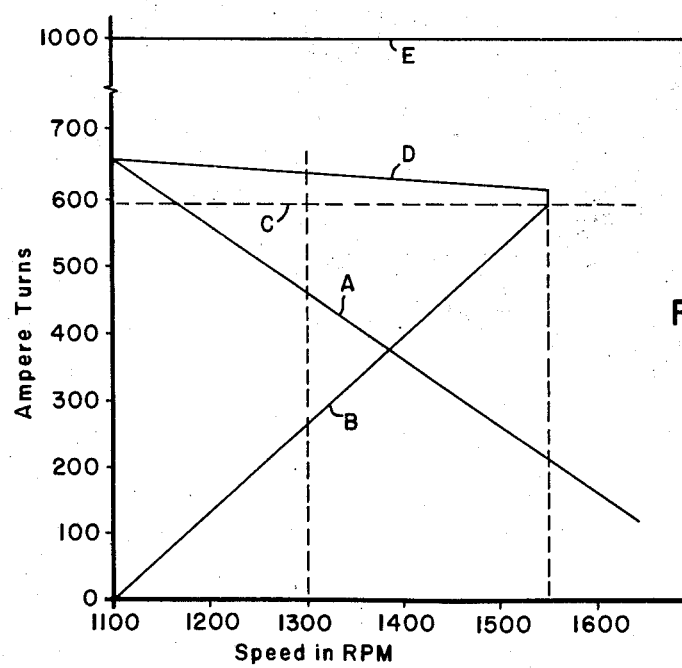
FIG. 2 is a view of curves illustrating the results accomplished by the invention.

The operation of the device perhaps can be best understood from the curves of FIG. 2. In FIG. 2, the abscissa represents increased speed in revolutions per minute and the ordinate represents increasing ampere-turns. The curve A represents the relationship of speed to ampere-turns of coil 56 and the curve B represents this relationship for coil 58. The dotted curve C is the drop out point of the relay 54; the curve D represents the ampere-turn to speed relation of the summation of coils 56 and 58. Curve E represents the pick up point of the relay 54.

The values on FIG. 2 were determined using a 15 horsepower adjustable speed drive of the type described in the instant application and including the overspeed protective circuit of this invention set to open the line-starter circuit at a speed of 10% above the set speed. With the motor set to operate at 1100 revolutions per minute, and with the relay 54 set to drop out at 594 ampere turns, coil 58 is short circuited. Thus, when the speed increases 10%, the total ampere-turns, which include only the ampere-turns on coil 56, decreases 10% to the drop out point at 594 ampere turns. At this speed, the total ampere turns at the set speed on coil 56 is 660 ampere turns. Thus, an increase of 10% in the speed of the drive will decrease the ampere turns on coil 56 by an amount of 66 ampere turns thus bringing the relay to its drop out point. At a second set speed, S1, of 1300 r.p.m., the number of ampere-turns on coil 56 is 460 and the number of ampere-turns on coil 58 is 180 resulting in a total number of ampere-turns tending to hold the relay in 640 ampere turns. When the speed of the motor exceeds the set speed of 1300 r.p.m. by 10% or reaches 1430 r.p.m., the ampere turns on coil 56 drops by 10% to 414. Thus, the total number of ampere turns on coils 56 and 58 drops to 594 reaching the drop out point of the relay 54. Similarly, if the set speed of the motor is set to some still higher point such as 1550 revolutions per minute, the ampere turns on coil 65 drops to 212. When the machine is so adjusted, the calibration rheostat 62 is set to provide enough resistance to cause a voltage increase across coil 58 to provide 402 ampere turns on coil 58. This results in a total ampere turns on coil 56 and coil 58 of 614. If the set speed S2 increased by 10% to 1705 r.p.m. the average turns on coil 56 will decrease by 10% or 21 ampere turns approximately to 191 ampere turns. This results in a total number of ampere turns of 593 or approximately the drop out point of the overspeed relay 54.

With the resistor 62 in series with the calibrating coil 64, the total number of ampere turns during starting exceeds the drop out point by a considerable number of ampere turns somewhere in the order of 1000 ampere turns to ensure pick up of the overspeed relay 54.

Thus, it can be seen that a unique overspeed protective system has been provided for an adjustable speed drive which utilizes an alternating current motor and in which the slip power supplies the armature of a D.C. motor. The speed of the drive is adjusted by varying the excitation of the D.C. field. The speed of the drive is sensed by a relay comprising a sensing coil 56 and a calibration coil 58; the sensing coil is energized by the slip power of the alternating current motor secondary which varies inversely in proportion to the speed of the alternating current motor. Summation of the voltage on the calibration coil and the sensing coil energizes a set of overspeed contacts which are in series with the holding contacts of a starting circuit. The calibration coil has a calibrating rheostat 62 which works in synchronism with the rheostat for varying the field excitation. Thus, the summation of the ampere turns on the overspeed relay coils is always in excess of the drop out point of the overspeed relay 54. The calibration rheostat 62 for calibrating the calibration coil 58 of the overspeed relay is so adjusted as to permit the starting circuit to be opened whenever the speed of the motor exceeds the set speed by the predetermined percentage. This unique protection circuit permits operation of the overspeed relay at any set speed and permits opening of the starting circuit at any given percentage of overspeed at any set speed. The starting switch operates in synchronism with another set of contacts 66 which short it out or introduce an additional resistance in parallel with the coil 58 during starting to assure pick up of the relay.

A certain specific embodiment of the invention has been shown and described for the purpose of illustration, but it will be apparent that various modifications and other embodiments are possible within the scope of the invention. It is to be understood, therefore, that the invention is not limited to the specific arrangement shown, but in its broadest aspects it includes all equivalent embodiments and modifications which come within the scope of the invention.

I claim as my invention:

1. In an adjustable speed drive comprising an alternating current motor and a direct current motor on a common output shaft wherein the rectified slip power of the alternating current motor is supplied to the armature of the direct current motor including means for adjusting the speed of said drive to a preselected set speed; a speed responsive device comprising means for sensing the slip voltage of said alternating current motor and means cooperating with said slip voltage sensing means to sensitize said sensing means to respond to a preselected speed differing from said set speed by a predetermined percentage of said set speed.

2. In an adjustable speed drive comprising an alternating current motor and a direct current motor on a common output shaft wherein the rectified slip power of the alternating current motor is supplied to the armature of the direct current motor and including means for adjusting the speed of said drive to a preselected set speed; an overspeed protective device comprising a relay having a coil and a contactor, said coil energized by the slip voltage of said alternating current motor to provide a number of ampere-turns varying inversely with the running speed of the drive, means for calibrating said coil in synchronism with said set speed adjusting means whereby said coil is effectively energized to actuate said contactor when the running speed of said drive is below a predetermined percentage of the set speed.

3. In an adjustable speed drive comprising an alternating current motor and a direct current motor on a common output shaft wherein the rectified slip power of the alternating current motor is supplied to the armature of the direct current motor; an overspeed protective device comprising means connected to the rotor winding of said alternating current motor for sensing slip voltage, means connected to the direct current motor for adjusting the speed of said drive to a preselected set speed, means cooperating with said sensing means for calibrating said sensing means for operation at any set speed and means responsive to the combined effect of said sensing means and said calibrating means for responding to a running speed which is in excess of the set speed by a predetermined percentage.

4. In an adjustable speed drive comprising an alternating current motor and a direct current motor driving a common output shaft wherein the rectified slip power of the alternating current motor is supplied to the armature of the direct current motor; an overspeed protective device including a relay having first and second coils, said first coil energized by rectified slip voltage of said alternating current motor to provide a number of ampere-turns varying inversely with the speed of the drive, said second coil energized by an independent direct current voltage source having a pre-selected value, said coils operable to actuate said relay when sufficiently energized.

5. In an adjustable speed drive comprising an alternating current motor and a direct current motor on a common output shaft wherein the rectified slip power of the alternating current motor is supplied to the armature of the direct current motor; an overspeed protective device including a relay having a first coil energized by rectified slip voltage of said alternating current motor to provide a number of ampere turns varying inversely with the speed of the drive, a second coil energized by an independent direct current source of supply voltage, means for adjusting the voltage across said second coil to provide a pre-selected number of ampere-turns at a given adjusted drive speed, said relay having contacts actuated by said coils when the summation of the ampere-turns of said first and second coils exceeds a pre-selected value.

6. In an adjustable speed drive comprising an alternating current motor and a direct current motor on a common output shaft wherein the rectified slip power of the alternating current motor is supplied to the armature of the direct current motor; an overspeed protective device including a relay having a first coil energized by rectified slip voltage of said alternating current motor to provide a number of ampere turns varying inversely with the speed of the drive, a second coil energized by an independent direct current source of supply voltage, means for adjusting the voltage across said second coil to provide a pre-selected number of ampere-turns at a given adjusted drive speed, said relay having contacts actuated by said coils when the summation of the ampere-turns of said first and second coils exceeds a pre-selected value, and means for temporarily increasing the summation of ampere-turns on said second coil during starting of the drive.

References Cited in the file of this patent

UNITED STATES PATENTS

| | | |
|---|---|---|
| 2,066,508 | Young | Jan. 5, 1937 |
| 2,288,338 | Willis | June 30, 1942 |
| 2,319,625 | Ostrander | May 18, 1943 |
| 2,359,145 | Myers et al. | Sept. 26, 1944 |